H. M. STEWART.
MECHANICAL MOVEMENT.
APPLICATION FILED MAR. 16, 1915.
1,145,445.
Patented July 6, 1915.
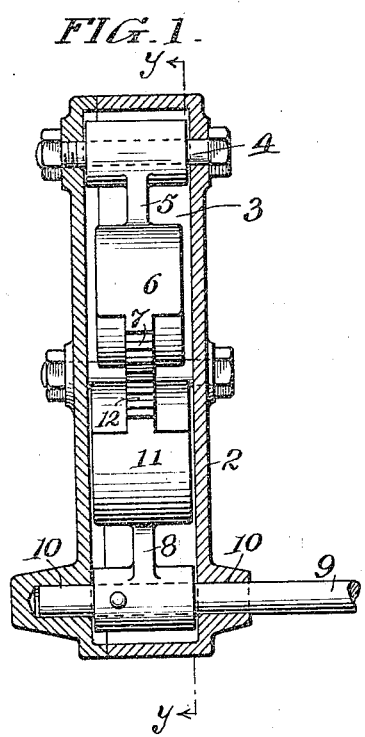
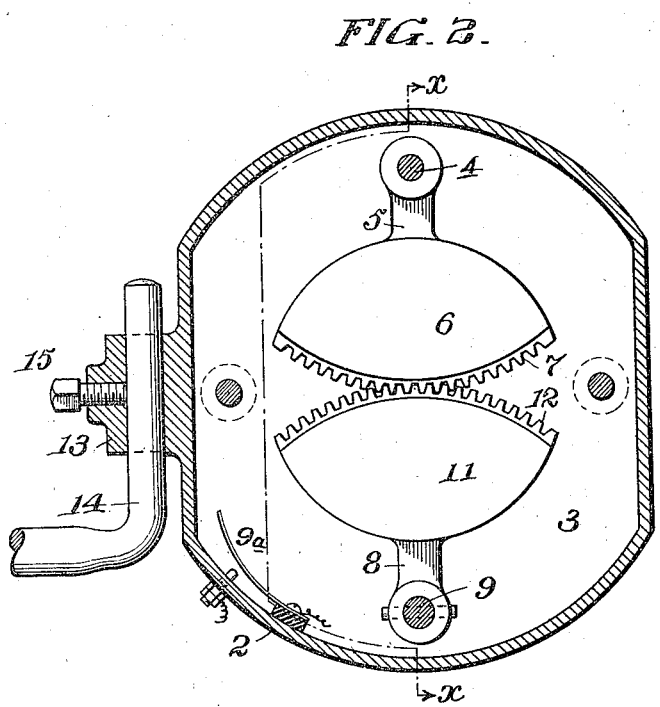
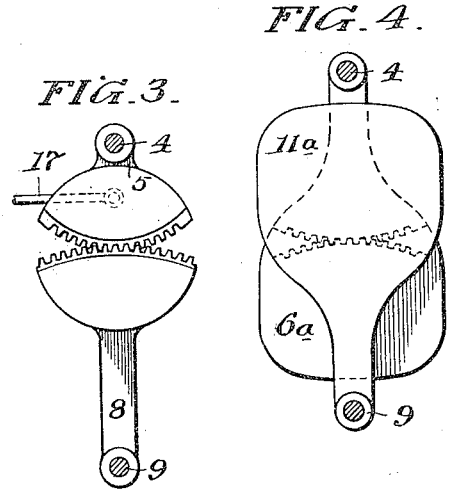
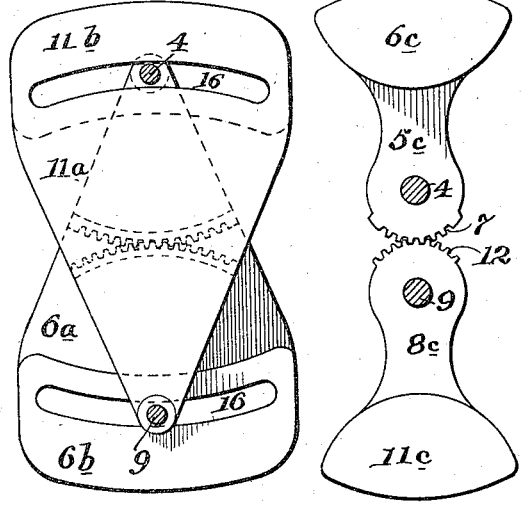
WITNESSES
Daniel Webster, Jr.
E. W. Smith.
INVENTOR
Henry M. Stewart
BY
ATTORNEY

UNITED STATES PATENT OFFICE.

HENRY M. STEWART, OF PHILADELPHIA, PENNSYLVANIA.

MECHANICAL MOVEMENT.

1,145,445.  Specification of Letters Patent.  Patented July 6, 1915.

Application filed March 16, 1915. Serial No. 14,653.

*To all whom it may concern:*

Be it known that I, HENRY M. STEWART, a citizen of the United States, and resident of Philadelphia, county of Philadelphia, and State of Pennsylvania, have invented an Improvement in Mechanical Movements, of which the following is a specification.

My invention has reference to mechanical movements of a character especially adapted to utilize the power of inertia of a body being put into or out of motion, whereby an intermittent operation may be given to any suitable movable part, irrespective of the particular purpose to which it may be applied.

More specifically, my object is to provide a mechanism which may be brought into operation by its carrier or vehicle to give motion under inertia to a movable part, both when the carrier is brought to a state of rest or put into a state of motion from a state of rest, or when changing the character of its motion.

Among the uses to which my improvement is adapted is that for displaying a signal or sign upon an automobile whereby a notice may be given to a driver of an automobile approaching from the rear that the forward machine is about to stop or has stopped, and thereby tend to avoid a collision. The same apparatus would put the signal or sign out of view when the automobile was started forward. Furthermore, a backward motion of the automobile would display the signal or sign to cause a rearwardly approaching machine to stop and avoid a collision. Other uses to which my invention may be put are to operate switches directly or indirectly to control electric circuits either for operating signal lights, alarms, horns or any devices for which my invention may be adapted; and in cases of the alarm the same may be electrically or otherwise operated, but controlled as to time of operation by my improved mechanism forming the subject matter of the present invention. The foregoing use is given by way of example only; the invention may be employed for any other suitable uses to which it may be adapted, whether in rolling stock or movable parts of fixed machines, and in fact for any purposes to which it may be applied with advantage.

My invention consists of two pivoted arms having mechanical engagement or connection so as to simultaneously rotate, swing or oscillate in the same direction at any moment, and said arms weighted in such manner that when said arms swing about their pivotal points the weights thereof will act to neutralize the gravitational efforts of said weighted arms, and at the same time permit the said arms to assume extreme positions to one side or the other of a vertical line through the pivotal points.

More specifically considered, my invention comprehends two weighted arms having geared engagement, said gears concentric with the axial pivots of the respective arms and said arms also provided with weighted portions and arranged so that the gravity action of the weight of one arm will at all times substantially counterbalance the material gravity action of the weight of the other arm, whereby said arms may be provided with weights of considerable magnitude to furnish power under the inertia produced by moving the pivotal points of the arms and the weights thereof or in the act of bringing them to rest from a state of motion.

My invention also comprehends details of construction which, together with the features above specified, will be better understood by reference to the drawings, in which:

Figure 1 is a sectional elevation of a mechanical movement mechanism embodying my invention, taken on line $x$—$x$ of Fig. 2; Fig. 2 is a sectional side elevation of the same taken on line $y$—$y$ of Fig. 1; and Figs. 3, 4, 5 and 6 are side elevations of modified forms of the movable elements entering into the construction of my improved mechanical movement.

2 is a casing and may be made of parts bolted together as indicated to provide an inclosed chamber 3. Pivoted on the bolt 4 near the top, and arranged within the chamber 3, is an arm 5, said arm being weighted at 6 and provided with a segmental curved rack 7, the pitch line of which is concentric with the axis of the pivotal bolt 4. The said arm 5 hangs downward from its pivotal support. 8 is the second arm, which is secured to a shaft 9 journaled in bearings 10 in the casing, and said arm 8 extends upward toward the arm 5 and is weighted at 11; it is provided with a rack 12 whose pitch line is concentric with the axis of the pivotal shaft 9. The racks 7 and 12 engage similarly to meshing portions of two geared wheels and, in fact, said racks constitute segments of gears whose axes are respectively at 4 and 9. The weights, racks and arms are all inclosed and wholly within the casing 2 and consequently are kept in a clean and operative condition.

In Fig. 1, I have shown the upper weight 6 of slightly less thickness than the lower weight 11 so that there is thus provided a little preponderance in the lower weight that it will retain itself in either of its two extreme positions to the right or left of a vertical plane through the axis or shaft 9. The addition of this extra weight in the lower weight 11 makes the device more stable at the extreme limits of its movement, so that it will not be needlessly vibrated by jarring. I do not restrict myself, however, to the use of this slightly excess weight in the lower weight portion 11 over the upper weight portion 6, and in some cases the weights would be equal or substantially equal.

In the position of the apparatus illustrated in Figs. 1 and 2 the arms and weights thereof are in the intermediate or accurately balanced position, namely, that in which the axis of the pivot bolt 4 and the shaft 9 are in the same vertical plane. If the arms swing to the right or to the left the auxiliary force which is exerted by the weight 11 is substantially counterbalanced by the retarding gravity force produced by the weight 6 which is moved by the action of the arm 8. The tendency of the weight 6 to fall to its neutral position acts to raise the weight 11 from its lowest to its highest position, and the relative proportions between these weights determine the sensitiveness of the device and the stability of the termination of its extreme motions. If the mechanism is made very light the inertia force will not be sufficiently great to overcome the friction and produce a power on the shaft 9 capable of being of material use, especially with slow moving carriers and variations in the movements thereof; but when the arms are weighted to a sufficient extent, the apparatus then becomes quite sensitive to normal changes of traveling motion of the casing 2 and the bearings of the pivotal supports. As shown in Fig. 2, the casing 2 is provided with a lug 13 fitting upon a bracket 14 and clamped in position by a set screw 15; and said bracket 14 may be secured to the rear of an automobile and thereby be given intermittent movement which is transmitted to the case and the apparatus as a whole.

The indicator, or the other device which is to be operated, may be suitably arranged to be actuated by the shaft 9 in any simple manner. The gearing between the two arms is so shaped or formed that the extreme movement at each side of a line connecting the pivotal axes of the two arms is limited and this movement to one side or the other is reduced to a reasonable limit, so as not to require too great an effort under the inertia action to shift the arms and their weights from their extreme positions.

It will be understood that the mechanical connection between the two arms and weights by the employment of the gearing is to be taken only as an example of means for connecting the two arms so that they move in unison, and simultaneously in the same direction at their free ends, and I do not restrict myself to this particular geared connection as the arms may be otherwise connected so long as they exercise the complete or substantial partial balancing of each other.

In Figs. 1 and 2 I have shown the radial length of the arms 5 and 8 as equal, but I do not restrict myself in this respect because they may be made unequal as indicated in Fig. 3, in which case the upper arm is far shorter than the lower arm. It is only necessary in this case to properly proportion the weights to insure the proper counterbalance. In the construction shown in Fig. 4 the weighted portions $6^a$ and $11^a$ are arranged respectively beyond the gearing and in this manner a much greater weight and leverage may be provided. In Fig. 5 I have shown the construction illustrated in Fig. 4 extended still farther, in which case the weight $11^a$ and $6^a$ are extended beyond the pivoted points of the arms for providing additional weights $6^b$ and $11^b$. To enable these to maintain their integrality with the remaining portions, I provide slots 16 through the extended weight portions through which the pivotal bolt 4 and shaft 9 may pass so as not to interfere with the action of the weighted portions of the arms. In the construction shown in Fig. 6 the arms $5^c$ and $8^c$ are respectively journaled at 4 and 9 and are geared together as at 7 and 12 corresponding to Fig. 2 but in this case the weights $6^c$ and $11^c$ are arranged radially outward beyond the pivots 4 and 9. In all of these cases the weighted portions of the two arms counterbalance each other wholly or in part and sufficiently to enable the mechanism to be quite sensitive and yet at the extreme end of each swing of the arms the weights will attend to locking the arms against any ordinary movement of the carrier to which the casing 2 may be attached. While the shaft 9 is the natural place of connection for delivery of the energy or power from the mechanism, it is manifest that I am not limited to such use as a mechanical connection may be made at any other suitable part such as at 17 in Fig. 3 by way of example, and especially if the device is to control switches, as such switches $9^a$ may be directly operated by the weights or arms. Such switches would constitute means for delivering the power from the moving arms just as the rocking shaft 9 may be so considered.

I do not limit myself to any particular shape of the casing or of the arms or weights; neither do I limit myself to the employment of gearing as the connecting means for making the two arms swing in the same direction simultaneously, as all of these details may be varied and modified without departing from the spirit of the invention.

Having now described my invention, what I claim as new and desire to protect by Letters Patent is:—

1. In a device of the character stated, a frame, two arms pivoted to the frame and mechanically connected so as to simultaneously swing in definite relation, said arms having weighted portions so shaped and positioned that the weight of one arm substantially counterbalances the weight of the other arm whereby the said arms and their weights will be acted upon by inertia for any sudden changes of the frame when moving or when starting the frame into motion from a state of rest, and means for delivering the power from the moving arms when the inertia acting upon the weights causes them to move.

2. In a device of the character stated, the combination of a frame, two arms pivoted thereto at a distance apart in the same vertical plane, said arms being mechanically connected so that their free ends simultaneously move in the same direction and also provided with weighted portions which substantially counterbalance each other, and means for transmitting power from the said arms and their weights whenever the said arms and weights are shifted in their relation to the frame under the action of inertia.

3. In a device of the character stated, the combination of a frame, two arms pivoted to the frame in the same vertical plane and said arms geared together and also respectively provided with weights adapted to substantially counterbalance each other, and means for transmitting motion from one of said arms whenever the weights are acted upon by inertia.

4. In a device of the character stated, the combination of a casing forming an inclosed chamber, an arm pivoted in the upper portion of said casing and hanging downward and provided with a weight and curved rack, a second arm pivoted in the lower part of the casing and extending upward and provided with a weighted portion and also a rack meshing with the rack of the first mentioned arm, said arms free to swing laterally simultaneously in the same direction to one side or the other about their pivoted points and the weight of one arm substantially counterbalancing the weight of the other arm, and means for transmitting motion from the said arms and weights extending to the outside of the casing.

In testimony of which invention, I hereunto set my hand.

HENRY M. STEWART.

Witnesses:
C. H. WISSMANN,
FLORENCE DEACON.

Copies of this patent may be obtained for five cents each, by addressing the "Commissioner of Patents, Washington, D. C."